Patented Nov. 27, 1945

2,389,837

UNITED STATES PATENT OFFICE 2,389,837

ALKYD RESIN COATING COMPOSITIONS

Charles Bogin, Terre Haute, Ind., assignor to Commercial Solvents Corporation, Terre Haute, Ind., a corporation of Maryland No Drawing. Application June 20, 1941, Serial No. 398,949

1 Claim. (Cl. 260—23)

My invention relates to coating compositions, and more particularly it pertains to coating compositions containing condensation products derived from the interaction of a polyhydric alcohol and a polybasic organic acid.

Resins of the above type commonly known to the art as "alkyd" resins, are available in various grades. Such resins are, in general, resistant to acids, oils, and alcohols, and exhibit exceptional durability on exposure to atmospheric conditions. Also, these resins cover a wide range of hardness, flexibility, and toughness, and have, in addition, excellent adhesion and retention of elasticity with age. They have the further desirable property of imparting gloss, and resistance to discoloration on baking, or prolonged exposure to light. Because of these outstanding properties, coating compositions containing alkyd resins have been suggested for a wide variety of uses in the coating and finishing art.

Resins of this type, notwithstanding the fact that they have many desirable characteristics, as noted briefly above, possess certain general properties which render them substantially useless in various fields. For example, in the presence of relatively strong alkaline solutions, films prepared from such resins are rapidly destroyed. In addition, although butyl alcohol has, in the past, been successfully employed for the purpose of lowering the viscosity of coating compositions containing resins of the above type, careful regulation of the quantities of butanol added, is required, since butanol itself is not a solvent for such resins. Thus, if butanol is employed in excess of the amount necessary to obtain optimum reduction of viscosity, precipitation of the resin from the solution very frequently occurs during evaporation of the solvent components. Also, in the application of coating compositions containing alkyd resins, if butyl alcohol is employed, together with solvents and diluents having relatively rapid rates of evaporation, the proportion of the concentrations of the latter to the former, becomes progressively smaller until a concentration of butyl alcohol in said composition is reached, which results in the premature separation of the resin from the freshly-applied film.

I have now discovered that the above-mentioned disadvantages which have in the past been encountered when using alkyd resin solutions for coating and finishing purposes, may be satisfactorily overcome by employing 1 to 5 carbon atom nitroparaffins as solvents for said resins. For example, resins of the above type containing a modifying agent which is composed principally of an unsaturated drying oil fatty acid, dissolve readily in a solution consisting of a nitroparaffin and one or more of the commonly-known hydrocarbon solvents for said resins, such as xylol, toluol, V. M. P. naphtha, and the like. The resulting coating compositions possess viscosities which render them adaptable to numerous methods of application.

The viscosities of alkyd resin coating compositions, just as in the case of most other coating compositions, are of considerable importance regardless of the method of application used. Inasmuch as the character of the solvent mixture employed affects not only the character of the coating obtainable, but also the viscosities of the liquid coating compositions, the choice of proper solvents to use with alkyd resins is highly important and depends to a large extent on the viscosity characteristics of the solutions obtained therewith. Although butanol, as previously stated, has heretofore been employed in resin solutions of this type, as the principal viscosity-reducing agent, it can only be used in limited proportions due to the fact that the butanol itself is not a true solvent for the alkyd resins. The nitroparaffins, however, present a distinct advantage over butanol as a viscosity-reducing agent for such resin solutions in view of the fact that said nitroparaffins are true solvents for resins of this type and may therefore be employed in any proportion desired without deleteriously affecting the viscosity of said solutions, or without causing the alkyd resin to precipitate therefrom at an undesirable stage during the evaporation of the solvent mixture. As a result, the films formed from alkyd resin coating compositions containing nitroparaffins are clear, tough, and strong, and in addition possess a very high gloss.

The tables below show the relative viscosities of certain alkyd resin solutions containing a nitroparaffin, as compared to the viscosities of such solutions in which no nitroparaffin has been added:

1. Table I.—(Solution contains 43 grams of short oil glycerine-phthalic anhydride resin modified with China-wood fatty acids per 100 cc. of volatiles)

| Variable | Per cent variable | Per cent toluol | Viscosity in centipoises at 30° C. |
|---|---|---|---|
| Xylol | 20 | 80 | 30 |
| Xylol | 10 | 80 | 18 |
| Butanol | 10 | | |
| Butanol | 20 | 80 | 10 |
| 1-nitropropane | 20 | 80 | 13 |

2. Table II.—(Solution contains 58 grams of short oil glycerine-phthalic anhydride resin modified with linseed oil fatty acids, per 100 cc. of volatiles)

| Variable | Per cent variable | Per cent high-strength naphtha | Viscosity in centipoises at 30° C. |
| --- | --- | --- | --- |
| Xylol | 20 | 80 | 200 |
| Xylol | 10 | 80 | 52 |
| Butanol | 10 | | |
| Butanol | 20 | 80 | 30 |
| 1-nitropropane | 20 | 80 | 54 |

The viscosity characteristics of resin solutions of the above type depend upon such factors as temperature of the solution, the concentration of the resin in solution, the viscosity characteristics of the particular grade of resin employed, and the composition of the solvent mixture. Therefore, it will be apparent that the proportion of diluents to nitroparaffins, employed in any particular coating compositions, will vary with the diluents used, the character and concentration of the resin, the probable temperature at which said composition is to be applied, and other such factors.

The following example is illustrative of the use of nitroparaffins in unpigmented alkyd resin coating compositions:

Example I

Short oil glycerine-phthalic anhydride resin modified with China-wood fatty acids  
grams per 100 cc__ 40  
Xylol _____ per cent__ 60  
Aliphatic naphtha _____ do____ 30  
1-nitropropane _____ do____ 10

The following is a formula illustrating the use of a mixture of nitroparaffins together with pigments in resin solutions of the above type:

Example II

Short oil glycerine-phthalic anhydride resin modified with linseed oil fatty acids  
grams per 100 cc__ 55  
Titanium dioxide pigment _____ do____ 5  
Carbon black _____ do____ 1  
Nitroethane _____ per cent__ 10  
1-nitrobutane _____ do____ 10  
High solvency naphtha _____ do____ 80

The alkyd resins which may be employed in the preparation of coating compositions, may be any of several types. For example, alkyd resins prepared as described in U. S. Pat. No. 1,893,873 to R. H. Kienle, are particularly suitable for use in coating compositions in which nitroparaffins are employed as viscosity-reducing agents. According to the procedure described by the above patent, alkyd resins of the type desired are prepared by reacting 370 parts of phthalic anhydride with approximately 92 parts of glycerine in the presence of approximately 140 parts of a fatty acid derived from one of the drying oils, such as China-wood, linseed, or perilla oil. In this connection, it is also to be noted that other oils such as soya bean oil may be substituted for the above mentioned drying oils to produce equally satisfactory resins.

The nitroparaffins which may be employed as solvents for the alkyd resins in the coating compositions of the present invention, may be conveniently prepared in accordance with the process disclosed in U. S. Patent No. 1,967,667 to H. B. Hass et al. Any of the nitroparaffins having from 1 to 5 carbon atoms of suitable boiling point and rate of evaporation are suitable for use as solvents for the preferred form of alkyd resin mentioned above. Examples of such solvents are nitromethane, nitroethane, 1-nitropropane, 2-nitropropane, the nitrobutanes, the nitropentanes, etc. Also mixtures in varying proportions of any of the above nitroparaffins may be employed, if desired. Coating compositions containing from 10 to 20 per cent of nitroparaffins are the most advantageous, as indicated in the above specific examples.

Having now described my invention, what I claim is:

A coating composition comprising a tough and strong resin, formed by the reaction of phthalic anhydride, glycerol and drying oil fatty acids, dissolved in a normally liquid hydrocarbon solvent with from 10 to 20 per cent of a 1 to 5 carbon atom mono-nitroparaffin present to reduce the viscosity of the composition and to prevent unfavorable precipitation of the resin during evaporation of the solvent mixture.

CHARLES BOGIN.